United States Patent
Rakes

[15] 3,667,018
[45] May 30, 1972

[54] BRUSHLESS DC MOTOR HAVING ELECTRONIC COMMUTATION RESPONSIVE TO ROTOR POSITION AND INDUCED ARMATURE WINDING VOLTAGE

[72] Inventor: Rodney G. Rakes, Bristol, Tenn.
[73] Assignee: Sperry Rand Corporation
[22] Filed: Sept. 28, 1970
[21] Appl. No.: 76,113

[52] U.S. Cl. .................................318/254, 318/439, 318/138
[51] Int. Cl. ......................................................H02k 29/00
[58] Field of Search...................318/138, 254, 696, 685, 439, 318/345

[56] References Cited

UNITED STATES PATENTS

| | | |
|---|---|---|
| 3,559,013 | 1/1971 | Burch et al. ...........................318/254 |
| 3,329,852 | 7/1967 | Saussele et al. ........................318/138 |
| 3,304,481 | 2/1967 | Saussele................................318/138 |
| 3,440,506 | 4/1969 | Krestel et al. ..........................318/138 |
| 3,274,471 | 9/1966 | Moczala.............................318/254 X |
| 3,559,014 | 1/1971 | Rakes ....................................318/254 |
| 3,453,514 | 7/1969 | Rakes et al. ...........................318/254 |

*Primary Examiner*—G. R. Simmons
*Attorney*—S. C. Yeaton

[57] ABSTRACT

A single sensor brushless DC motor contains two windings that are alternately energized to sustain rotor rotation and includes transistor switches in series with each motor winding. The transistor in series with the first winding is driven directly from the sensor so as to energize the first winding when the sensor is illuminated and that transistor is driven into saturation. The transistor in series with the second winding has an input terminal coupled to the first motor winding so as to react to voltages induced in the first winding during times when the first winding is de-energized.

4 Claims, 2 Drawing Figures

Patented May 30, 1972

3,667,018

INVENTOR
RODNEY G. RAKES
BY Joseph M Koehl
ATTORNEY

3,667,018

BRUSHLESS DC MOTOR HAVING ELECTRONIC COMMUTATION RESPONSIVE TO ROTOR POSITION AND INDUCED ARMATURE WINDING VOLTAGE

BACKGROUND OF THE INVENTION

1. Field of the Invention

This invention relates to brushless DC motors and more specifically to single sensor brushless DC motors.

2. Description of the Prior Art

Single sensor brushless DC motors (BDCMs) are known in the art. U.S. Pat. No. 3,453,514, for instance, issued to R. G. Rakes and R. A. Fink and assigned to the present assignee describes a single sensor BDCM in which an optical sensor is illuminated during one half of each revolution of the rotor and darkened during the opposite half of each revolution. A double-pole, double-throw type of solid state switching means connects a single stator winding to a suitable DC source. The switching means is actuated in response to the illumination level of the optical sensor so as to reverse the direction of current flow through the single stator winding in synchronism with the rotor rotation.

Although the motor of the aforementioned patent provides a significant simplification in commutation means over the prior art, the motor of the present invention still further simplifies the commutation circuitry and thus provides a motor useful in applications requiring simple, inexpensive units.

SUMMARY OF THE INVENTION

The BDCM of the present invention utilizes a single sensor to detect rotor position and to steer energizing current alternately between two stator windings. The current flow through one winding is switched in direct response to signals from the sensor. The current flow through the second stator winding is switched in response to the back EMF induced in the first winding by rotation of the magnetized rotor.

DESCRIPTION OF THE PREFERRED EMBODIMENT

Figure 1:
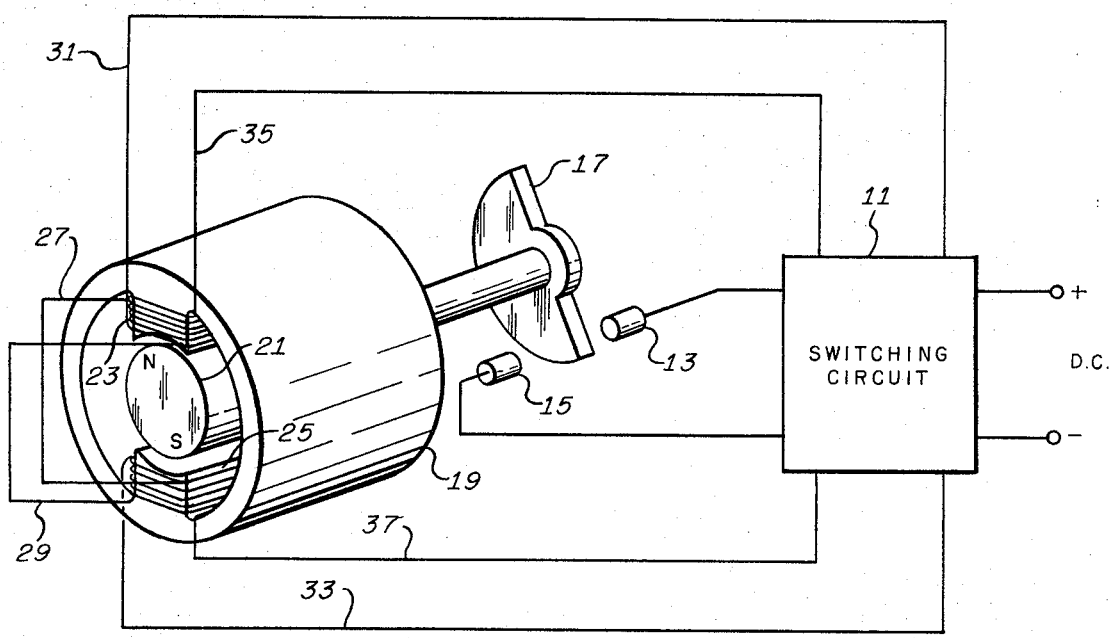
FIG. 1 is a diagram, partly in perspective, useful in explaining the invention.

FIG. 1 illustrates a motor of the type which may be used in practicing the invention. Power from a DC source is switched to appropriate stator windings by means of a switching circuit 11. The commutating means typically consists of a light source 13 and a photosensor 15 operating in conjunction with a semicircular light shield or shutter 17.

The motor contains a stator 19 and a permanent magnet rotor 21 which rotates between a stator pole 23 and a stator pole 25. Each stator pole contains a pair of oppositely wound stator coils. Correspondingly wound stator coils on each pole are connected together through the line 27 or the line 29 to form a single stator winding.

Current is supplied to one pair of stator coils through the lines 31 and 33 from the switching circuit 11 and to the other pair of stator coils through the lines 35 and 37.

Thus, during one-half of each revolution, current is supplied to a first pair of stator coils by means of the line 31, the connecting line 27 and the line 33 to establish a magnetic field in a given diametrical direction. During the other half revolution, current is supplied through the line 35, the connecting line 29 and the line 37 to establish a magnetic field in the opposite diametrical direction.

The light shield 17 is oriented so that the magnetic field produced by current in one stator winding will be reversed just before the N–S axis of the rotor becomes aligned with the center line of the stator poles. This permits the rotor to continue operating in the desired direction.

Figure 2:
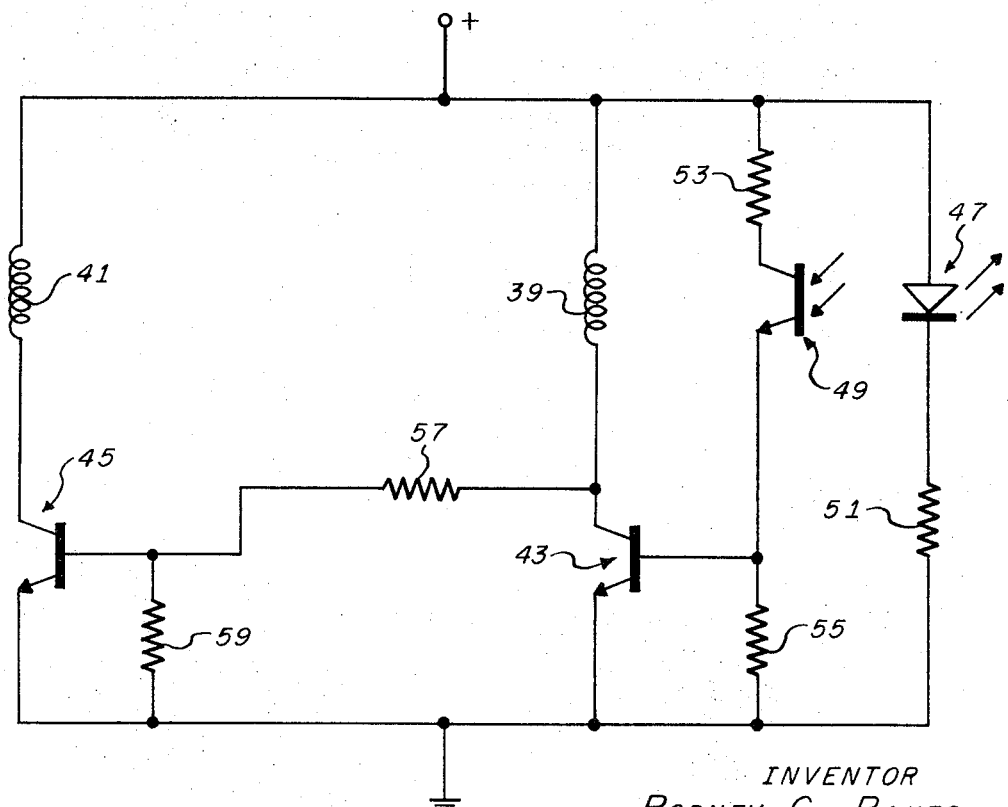
FIG. 2 is a circuit diagram illustrating the presently preferred embodiment of the invention.

The circuit of the invention is illustrated in FIG. 2. The voltage from the DC source is alternately applied to the stator windings 39 and 41 through the switching transistors 43 and 45, respectively.

A conventional light source such as a luminescent diode 47 actuates a photosensor 49 in response to modulations set up by the light shield. A suitable resistor 51 is placed in series with the light source 47 so as to limit the current through the source to a suitable value. Similarly, series resistors 53 and 55 are placed in series with the photosensor 49 to provide desired voltages for operating the transistor switch 43.

The base of the switching transistor 45 is connected through a resistor 57 to the junction of the stator winding 39 and the collector electrode of the transistor 43, and to the grounded side of the DC supply through a resistor 59.

The collector electrode of the transistor 45 is connected to the stator winding 41.

As the rotor of the brushless DC motor rotates, the transistors 43 and 45 are alternately driven into conduction so as to thus alternately energize the stator windings 39 and 41 in synchronism with light modulations detected by the photosensor 49.

The resistors 53 and 55 are selected so that the transistor 43 is driven into conduction whenever the sensor 49 is illuminated and driven to cutoff when the sensor 49 is darkened.

As the permanent magnet rotor rotates, it induces a back EMF in either stator winding during the time that the winding is de-energized. The present invention utilizes this back EMF to switch the transistor 45 and maintain this transistor in the conducting condition during the appropriate half cycle.

The resistors 57 and 59 are selected so that this back EMF in conjunction with the voltage from the DC supply will drive the transistor 45 into conduction whenever the transistor 43 is driven to cutoff. During the time that the transistor 43 is cut off, the back EMF induced in the winding 39 is approximately equal to the DC power supply voltage. Thus a voltage of approximately twice the DC supply voltage is available to drive the transistor 45.

The resistors 55 and 59 not only contribute to the formation of suitable voltages at the bases of the switching transistors, but also enhance the temperature stability of the circuit.

Since the single photosensor drives only one of the transistors directly, the present circuit requires fewer components than prior art circuits and thus reduces the switching circuit to an extremely simple form. Thus in applications where extreme simplicity or minimum weight requirements must be met, the present circuit provides an inexpensive, light weight means of commutating a brushless DC motor.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. An improved switching circuit for a single sensor brushless DC motor, said motor being of the type containing first and second stator windings energizable from a DC source and arranged to provide magnetic fields in first and second diametrically opposed directions respectively, a permanently magnetized rotor rotatable in response to magnetic fields established by said stator windings and means to actuate said sensor when and only when said rotor is positioned within a predetermined semicircular sector, said improved switching circuit comprising means connecting one end of each of said stator windings to one side of said DC source, first and second switching means for optionally connecting the other end of said first and second stator windings respectively to the other side of said DC source, first means for driving said first switching means directly from said sensor, said first means being arranged to close said first switching means when said sensor is actuated, and second means for driving said second switching means in response to voltages appearing at said other end of said first stator winding, said second means including a voltage divider proportioned to close said second switching means only when said voltages exceed the voltage level of said DC source.

2. The switching circuit of claim 1 wherein said first and second switching means each include a transistor having base, collector and emitter electrodes, said transistors being connected so that their collector-emitter circuits are in series with the respective stator windings and wherein said voltage divider includes a first resistor connected directly between the base electrode of the transistor in said second switching means and the collector electrode of the transistor in said first switching means, said voltage divider further including a second resistor connected directly between the base and emitter electrodes of the transistor in said second switching means.

3. The switching circuit of claim 2 wherein the single sensor is a photosensor and the means to actuate the sensor includes a semicircular light shield mounted so as to rotate with said rotor.

4. The switching circuit of claim 3 wherein the photosensor is connected in a series configuration across said DC power supply, said series configuration including a resistor having one end connected to said other side of the DC power supply, and wherein said first means includes means connecting the base electrode of the transistor in said first switching means to the other end of said resistor, said resistor having a magnitude such that it developes a voltage sufficient to saturate the transistor only when said photosensor is illuminated.

* * * * *